(No Model.) 5 Sheets—Sheet 1.

C. F. VIEILLARD & H. OSSWALD.
MACHINE FOR MAKING CHAIN LINKS OF SHEET METAL.

No. 580,564. Patented Apr. 13, 1897.

*Fig. 1.*

Witnesses
Edw. Thorpe
Edw. McLean

Inventors
C. F. Vieillard
Herman Osswald
By their Attorney
Ariodutt Parsons.

(No Model.) 5 Sheets—Sheet 2.
C. F. VIEILLARD & H. OSSWALD.
MACHINE FOR MAKING CHAIN LINKS OF SHEET METAL.
No. 580,564. Patented Apr. 13, 1897.

Fig. 2.

(No Model.) 5 Sheets—Sheet 3.
C. F. VIEILLARD & H. OSSWALD.
MACHINE FOR MAKING CHAIN LINKS OF SHEET METAL.
No. 580,564. Patented Apr. 13, 1897.

(No Model.) 5 Sheets—Sheet 4.
C. F. VIEILLARD & H. OSSWALD.
MACHINE FOR MAKING CHAIN LINKS OF SHEET METAL.
No. 580,564. Patented Apr. 13, 1897.

Witnesses
Edward Thorpe
Edw. McLean.

Inventors
C. F. Vieillard
Herman Osswald
By their Attorney
Hinsdill Parsons.

(No Model.) 5 Sheets—Sheet 5.

C. F. VIEILLARD & H. OSSWALD.
MACHINE FOR MAKING CHAIN LINKS OF SHEET METAL.

No. 580,564. Patented Apr. 13, 1897.

Witnesses
Edward Thorpe
Edw. McLean

Inventor
C. F. Vieillard
Herman Osswald
By their Attorney
Ansdell Parsons

UNITED STATES PATENT OFFICE.

CELESTIN F. VIEILLARD, OF WOOD HAVEN, AND HERMAN OSSWALD, OF BROOKLYN, NEW YORK, ASSIGNORS TO SYLVANUS D. LOCKE, OF HOOSICK FALLS, NEW YORK; ELLEN J. LOCKE, ADMINISTRATRIX, AND SYLVANUS D. LOCKE, JR., ADMINISTRATOR, OF SAID SYLVANUS D. LOCKE, DECEASED.

MACHINE FOR MAKING CHAIN-LINKS OF SHEET METAL.

SPECIFICATION forming part of Letters Patent No. 580,564, dated April 13, 1897.

Application filed March 6, 1893. Serial No. 464,836. (No model.)

*To all whom it may concern:*

Be it known that we, CELESTIN F. VIEILLARD, residing at Wood Haven, Long Island, and HERMAN OSSWALD, residing at Brooklyn, New York, citizens of the United States, have invented certain new and useful Improvements in Machines for Making Chain-Links of Sheet Metal and Means for Assembling the Links into a Chain, of which the following is a full, clear, and exact description, reference being had to the accompanying drawings, forming part of this specification.

Our invention relates to a machine for making chain-links, as shown in the application of Sylvanus D. Locke, of Hoosick Falls, New York, said application bearing the serial number 424,604, filed March 11, 1892, and the means for assembling the links is also an improvement upon those employed in manufacturing chain-links as shown in the application of said Sylvanus D. Locke, Serial No. 424,603, filed March 11, 1892. We do not base any claim on the aforesaid inventions of Locke, but our inventions are subsidiary and subordinate thereto.

It is well known to those familiar with the art that detachable drive-chains, as commercial commodities, are sold with the links assembled. Previous to said Locke's invention chain-links were made of malleable iron and the links assembled into a chain either by a machine or by hand, the latter process being somewhat expensive. When assembled by machines, the end bar of one link was inserted into the hook or sprocket-bar of a contiguous link by either an endwise or sidewise movement, according to the construction of the links and whether they were attachable or detachable by sidewise or endwise movement. According to Locke's invention the links are made of a continuous strip of steel or other metal and the lower portion of the hook of the sprocket-bar and the hook of the end bar are formed from metal taken from between the side bars.

A part of our invention relates to means for assembling drive-chain links into a chain; and it consists in forming the sprocket-bars of the links from sheet metal and rolling up and forming each bar over the end bar of the link immediately preceding, and we believe that we are the first in the art of manufacturing detachable drive-chains from sheet metal to form the sprocket-bar of one link over the end bar of an adjacent link.

By this invention the final step in the manufacture of each link assembles the link with those previously formed into a chain.

With our invention applied to Locke's a detachable drive-chain is made automatically, whereas according to Locke's invention drive-chain links were automatically made.

Our invention also consists in an extractor or a device for moving or stepping along the chain a proper distance, so that the end bar of the link whose sprocket-bar has been formed around the end bar of the preceding link may be brought into proper position to have its end bar in turn encircled with the sprocket-bar of the succeeding link.

Our invention also consists in a tube or guideway to confine the ribbon of metal, so that as a strip runs out the last end will all be forced into the machine between the dies by the forward end of a new strip, the tube being placed intermediate the feeding-rollers and the dies. We also provide a knife located at the proper distance from the dies, so that the ribbon may be cut off at the proper point to insure a length which is a multiple of the length of the material required for a chain-link, and to also insure the new strip or ribbon that crowds after the old strip roll of ribbon entering the dies correctly, so that a complete link may be formed from the strip last introduced, as well as from the last end of the old strip.

Our invention also consists in a finger attached to the upper die by which the end of the lower part of the sprocket-bar is formed at a proper distance from the end of the upper lip of the sprocket-bar to permit the ready passage of the side bar of a link when it is desired to couple or uncouple the same.

Our invention also consists of a spring stop or detent that receives from the extractor and holds from displacement the links last assembled while the forming-dies assemble another link thereto.

Our invention also consists in a guideway through which the extractor forces the assembled links, that guides them and holds them under the action of the detent.

Our invention also consists in such other and further parts and combinations as are hereinafter described and claimed.

Referring to the accompanying drawings, in which our invention is illustrated, and in which similar letters and numerals of reference indicate like parts.

Figure 1:
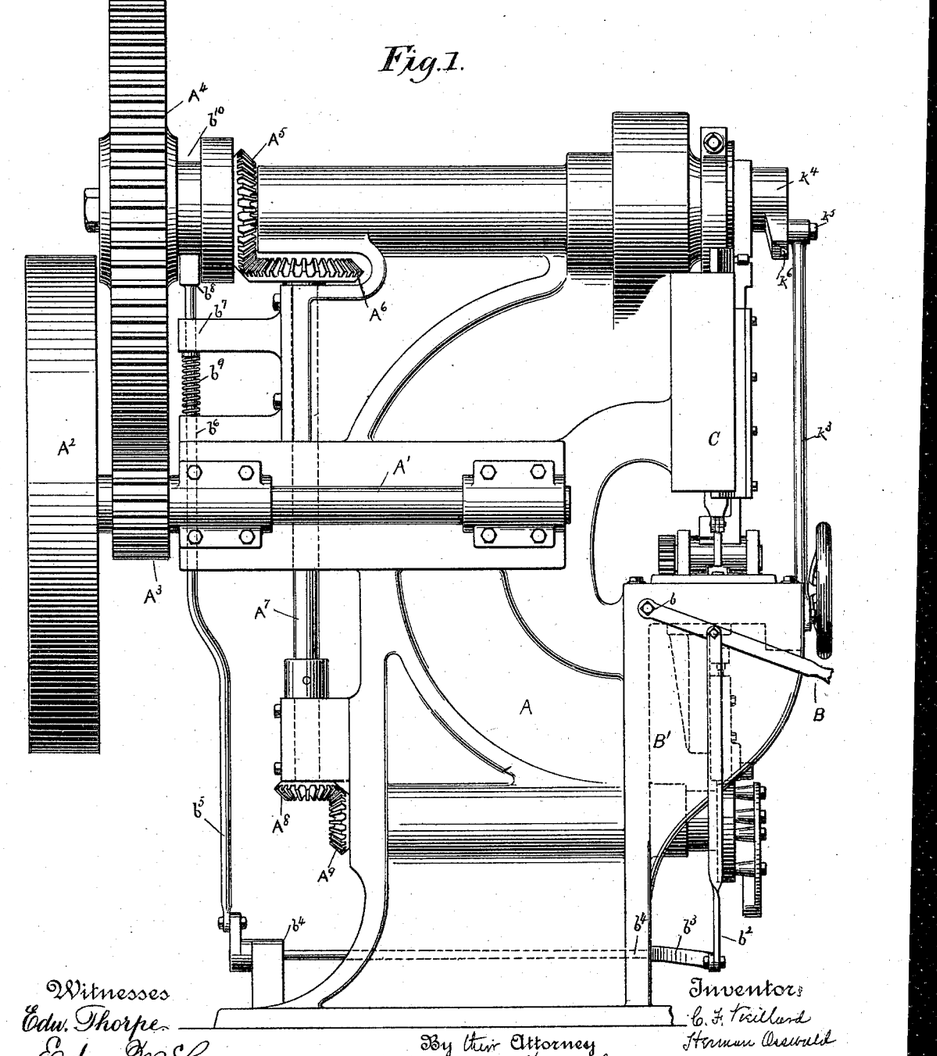
Figure 1 is a side elevation of a machine embodying our invention.
Figure 2:
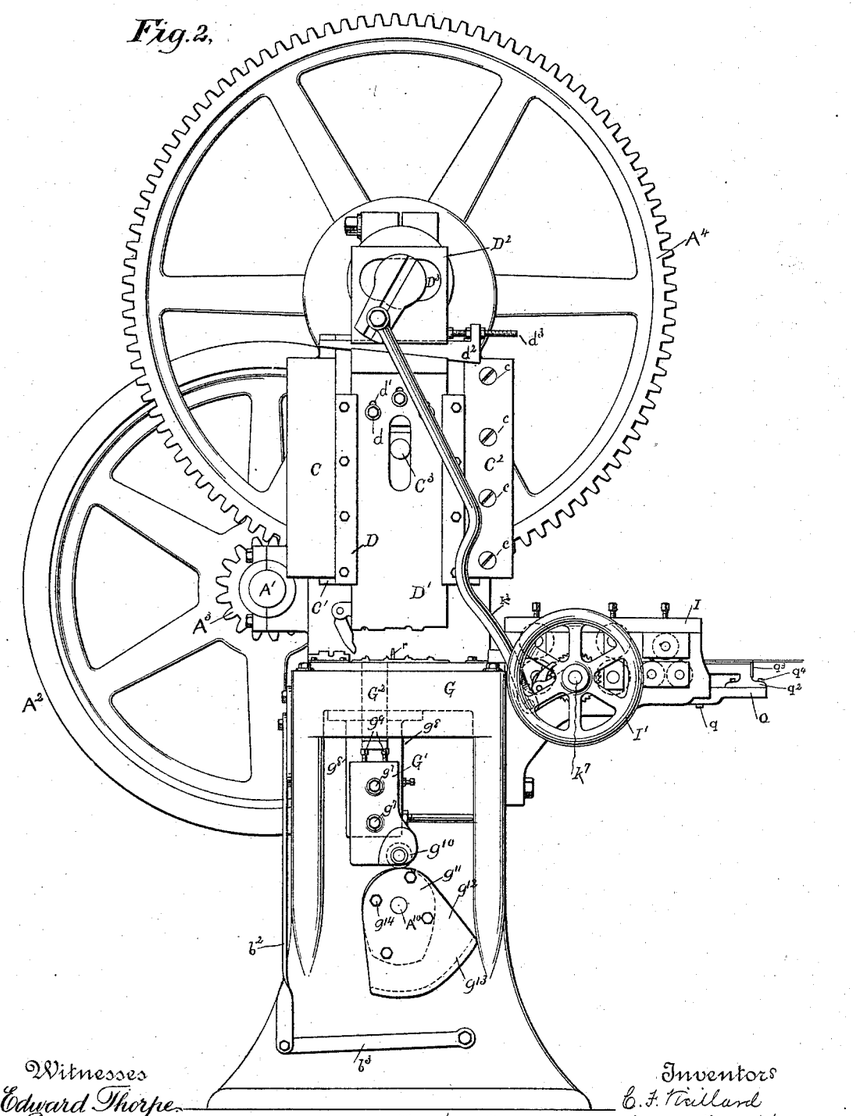
Fig. 2 is a front elevation.
Figure 3:
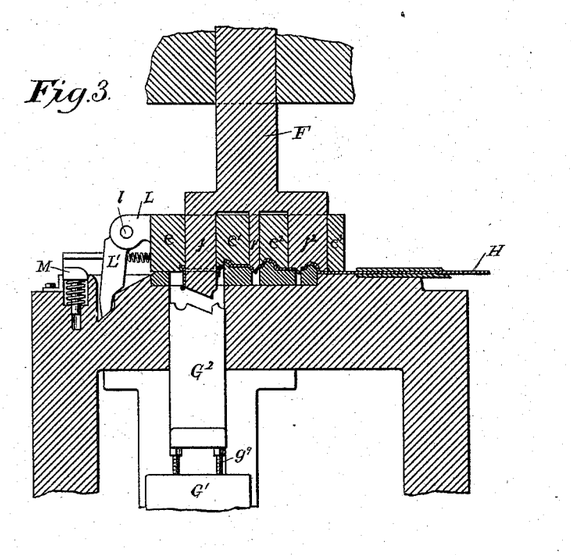
Figs. 3, 4, and 5 are vertical longitudinal sections through the upper, lower, and stationary dies, the dies being shown in different positions.
Figure 4:
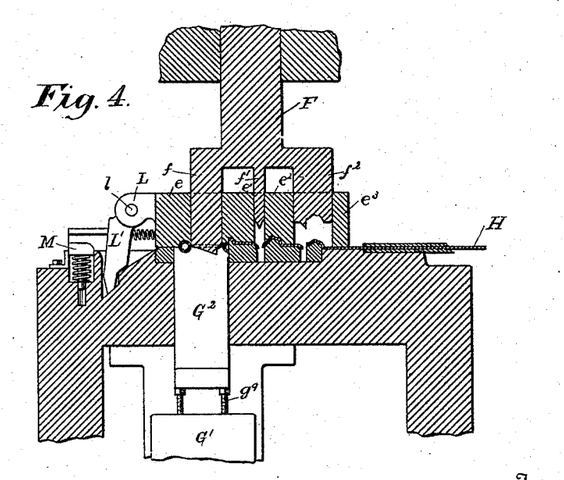
Figure 5:
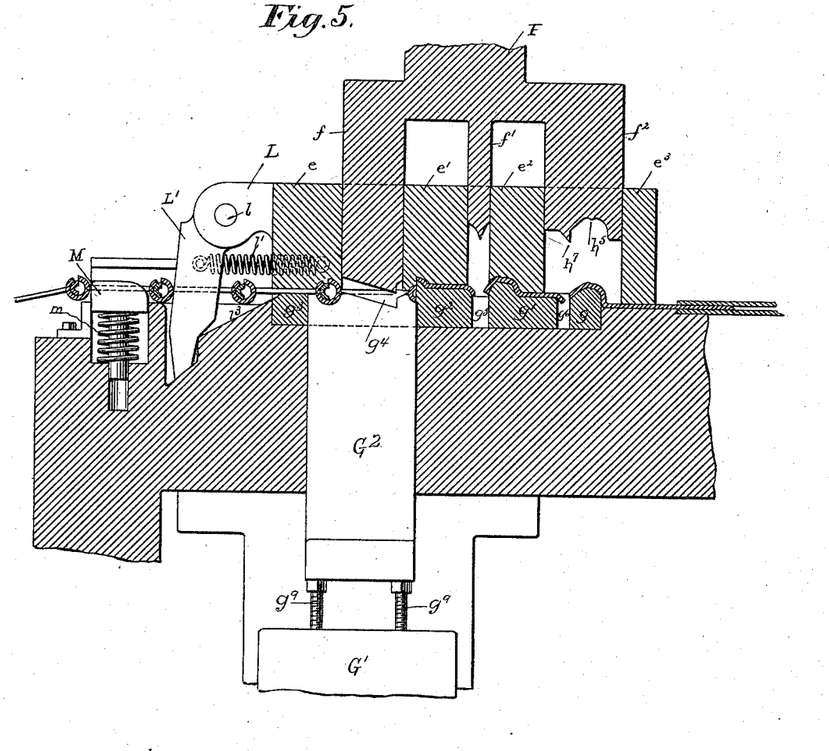

Referring to Fig. 1, A is the framework, in which are provided suitable bearings for the driving-shaft A', to which are attached the pulley $A^2$ and gear-wheel $A^3$, which drive the gear $A^4$, attached to the upper crank-shaft, mounted in the frame. The upper crank-shaft carries a gear $A^5$, meshing with gear $A^6$, secured to a vertical shaft $A^7$, which at its lower end carries a gear $A^8$, driving through gear $A^9$ the lower shaft which actuates the lower reciprocating dies. The machine receives its motion through the wheel $A^2$ and a suitable belt.

B is a lever pivoted at $b$ to the block B' and connected to rod $b^2$, which is pivoted to crank-shaft $b^3$, mounted in bearings $b^4$, and joined to vertical rod $b^5$, mounted in bearings $b^6$ and $b^7$, and carrying at its upper end a plunger $b^8$, between which and the bearing $b^6$ is interposed a spring $b^9$. The plunger takes into a cam-groove $b^{10}$ of a spring-pressed clutch, secured to the upper crank-shaft by spline and groove, the gear $A^4$ being provided with a corresponding clutch. Through means of lever B the machine may be thrown in gear. This mechanism, however, is not material, as any other suitable mechanism will answer. The upper dies are substantially similar to those shown in the application of Locke aforesaid, Serial No. 424,604, and are operated similarly, but, while giving herein a general description of the same, we refer for a more specific description to the said application.

Referring to Fig. 1, C is the guideway in which the slide C' moves up and down, the guideway and slide being suitably grooved or mortised and the guideway C being provided with a removable side $C^2$, held in position by means of the screw-bolts $c$ to permit the more ready insertion of the slide C'. Guide-plates D are secured to the slide C' to hold the slide D' in place. The slide D' carries the holding-dies and the slide C' the punching-dies, and the slide D' has a movement imparted to it independent of the slide C'. The slide C' is connected to a pitman $C^3$, the upper end of which is mounted on an eccentric on the crank-pin of the upper shaft, by which eccentric reciprocating movement is imparted to the slide C'. The slide D' is bolted by bolts $d$, passing through slots $d'$ to a plate $D^2$, provided with a cam-slot in which the crank-pin of the upper crank-shaft operates. Between the plate $D^2$ and the slide D' is interposed a key $d^2$, adjustable by a screw $d^3$, secured into plate $D^2$, the upper end of the slide D' being suitably beveled so that by the adjustment of the nuts or screw $d^3$ and by means of the bolts $d$ and slots $d'$ the slide D' is vertically adjustable. The plate $D^2$ is provided with a cam-slot $D^3$, taking over the crank-pin of the upper crank-shaft, which eccentric cam-slot is so shaped that as the crank-shaft revolves the dies carried in the slide D' are moved downward to clamp the metal against the lower stationary dies and are then arrested, while the dies on slide C' are carried down into the openings between the stationary dies to perform their work and again ascend to meet the clamping or holding-dies, when both sets of dies ascend for a second operation. The clamping-die E consists of four members $e\ e'\ e^2\ e^3$, which may or may not be integral. These members of course press on each side of the strip, and the die F has its three members $f\ f'\ f^2$ projected between the members of the clamping-die. The lower stationary dies are mounted in the bed G and consist of the members $g\ g'\ g^2\ g^3$, between which are the openings $g^4\ g^5\ g^6$. In the opening $g^4$ reciprocates a lower slide G', carrying a die $G^2$, which is secured by bolts $g^7\ g^7$, passing through slots to the slide G', guided in ways $g^8$. By means of set-screw $g^9$, interposed between the die $G^2$ and slide G', the die is vertically adjustable. On slide G' is mounted a friction-roller $g^{10}$, which rests on the cam $g^{11}$ of cam-plate $g^{12}$, secured to lower shaft $A^{10}$, by means of which cam the slide G' is moved up. The cam-plate has secured to it by bolts $g^{14}$ an internal cam $g^{13}$, which bearing on the top of the roller $g^{10}$ as shaft $A^{10}$ revolves draws the slide G' down.

Two guides $r\ r$ are provided in the stationary dies to guide the metal strip as it is being forced along over the dies, suitable indentations being made in the clamping-dies for the entrance of the pins or guides $r\ r$.

Figure 6:
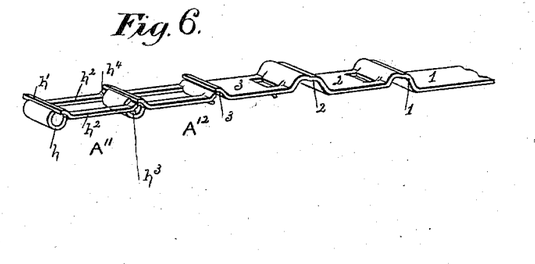
Fig. 6 is a perspective view of a strip of steel, illustrating the different steps in our invention.

By reference to Fig. 6 the shape of the dies and the various operations performed will be at once apparent, it being borne in mind that the lower stationary dies, so far as their acting surfaces are concerned, are opposite to the upper dies.

$A^{11}$ $A^{12}$ represent the complete links. The hook $h$ and lip $h^3$ are formed from metal taken from between the side bars $h^2$, and the lips $h^4$ $h'$ from a transverse section bent up from the strip of metal. The links are attachable and detachable by a sidewise movement, although we do not limit our invention to links detachable or attachable in this particular way. The strip of metal H is fed into the machine so that its forward end will register immediately under the point $h^5$ of die $f^2$. The clamping-dies descending and holding the metal, the strip is bent, as shown in section 1 of Fig. 6, by dies $f^2$, which then ascending, together with the clamping-die, the strip is fed along so that its forward end registers with the point $h^6$ under die $e^2$, when the clamping-die descending, together with the die E, the second section is formed, as shown in section 2 of Fig. 6, the part $h^6$ making the lips $h^4$ and $h^7$, cutting the metal transversely and longitudinally to form the lip $h'$ in the interior, section 1 having been formed in the strip by die $f^2$. The dies then ascend and the front end of the strip is fed along until it registers with the part $h^8$ in $e'$. The dies descending, $e^2$ gives the initial bend to the lip punched out to form $h$ and severs the metal longitudinally and initially bends the metal to form $h^3$, thus forming section 3, sections 2 and 1 being formed in the strips by the dies, as previously described. The dies ascending, the strip is fed along until its forward end registers with part $h^9$ of member $e$. The dies descending, member $e$, with its cutting edge, severs section 4 from section 3 at line 5. $f$ completes the longitudinal interior shear of the metal to form lips $h$ and $h^3$. The die G', ascending, rolls up into a hook the lip $h$, which follows the contour of $h^{11}$, and lip $h^3$, which follows contour of $h^{12}$, the dies forming in the strip the parts or sections 3 2 1, as previously described. It is evident that a completed link is turned out at each stroke of the dies.

The strip of metal H is wound in a roll, from which it is taken and fed to the machine by the feeding-rollers $i$ $i'$ $i^2$ $i^3$, which are mounted in a framework I, secured to part G. The rolls $i$ $i'$ are mounted in boxes adjustable, respectively, by the set-screws $i^8$ $i^9$, so as to regulate the pressure of the rolls upon the metal, which of course passes between the upper and lower rolls.

I' is a hand-wheel secured to a shaft $k^7$. Mounted on the side of frame I, secured to this shaft, are the ratchet-wheels $k$ $k$ $k$, made of different pitch, so as to regulate the throw of the shaft $k^7$. These ratchet-wheels are engaged by the pawls $k'$ $k'$ $k'$, which are spring-pressed. The pawls are mounted on a frame $k^2$, which is pivoted on the shaft $k^7$, to which frame the lever $k^3$ is also pivoted, the upper end of the lever being secured to a crank $k^4$ of upper shaft, on which crank it is adjustable by means of the bolt and nut $k^5$ and slot $k^6$. The revolution of the upper shaft will of course turn the ratchet-wheels $k$, and consequently the shaft $k^7$, to which they are secured. The shaft $k^7$ projects through the frame I and carries a gear $k^8$, which meshes with a gear secured to roller $i^3$, which latter gear meshes with and drives the gear $k^9$, and consequently the roller $i$. The gear $k^8$ also drives the roller $i^2$ through a gear secured to the latter, the gear $k^{10}$ meshing with the gear secured to roller $i^2$ and driving thereby the roller $i'$.

The straightening device consists of the three rollers $i^4$, $i^5$, and $i^6$, which latter is projected between the rollers $i^4$ $i^5$ and is mounted in a box adjusted by means of set-screw $i^7$. It will be noticed that the lower dies are of such form at their feed sides that the strip is readily fed over them by the feeding mechanism.

The machine as previously described is the invention of the said Locke, and a general description thereof has been given in order that our invention may the more readily be understood.

Figure 10:
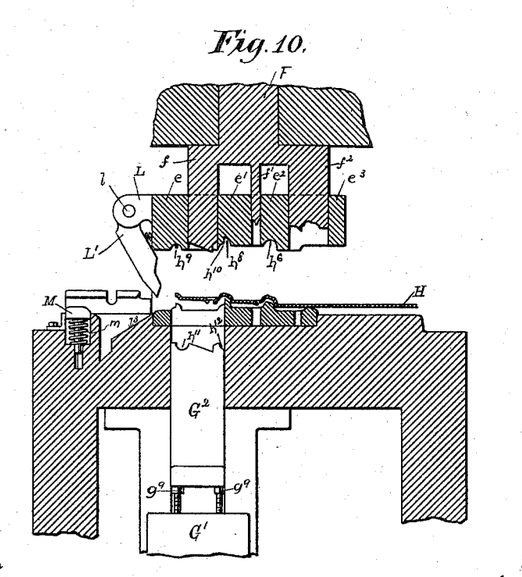
Fig. 10 is a vertical longitudinal section showing the upper dies at the limit of their upward movement.

Member $e$ of die E is formed with an offset L, in which at $l$ is pivoted a finger or extractor L', between which and member $e$ is interposed a spiral spring $l'$. The lower part of the finger is narrowed down so that its point will enter between the sprocket-bar of the link and member $e$, the link projecting some distance beyond the member $e$. The finger is held back by the spring $l'$ or other suitable device, and as the die $e$ descends the finger enters between the side bars of the link. The end of the finger is inclined and rides as $e$ moves down upon the incline $l^3$, thus forcing the finger outwardly against the action of spring $l'$. The inner edge of the finger is stopped against edge of member $e$. The bed G is suitably recessed to receive a spring stop or detent M, wide enough at its upper end to fit between the sprocket-bars of two adjacent links when coupled. The detent M is pressed upward by a spring $m$ and is formed with its upper edge toward the finger L', beveled or inclined to more readily permit the forcing of the chain along. The inclined edge also acts as a cam by which the chain as it is pulled out of the machine forces the detent down. Two upper guideways $l^4$ and two lower guideways $l^5$ are provided to prevent the chain from kinking and to hold it in place for the action of finger L' and detent M. The rear upper guide is indented at $m$ for the pin $l'$, which descends into the indentation. The operation of this part of our invention is as follows: Enough links having been made so that the first having been placed over the detent M and the last will have its end bar under the part $h^{10}$ of die $e'$, the dies being separated, as shown in Fig. 10, and the strip of metal having been fed along by the feeding mechanism as the upper dies ascend until the forward edge of the bar $h$ of the link is immediately under the feed side of the part $h^9$ (whose purpose is to be hereinafter explained) of die $e$, the dies descend, and the finger L' being forced against the cam $l^3$ pulls the chain from the dies or steps it along such a distance so that the end bar formed by hooks $h^3$ and $h^4$ of the last link of the chain is immediately under the lip $h'$ of the forward end of the strip. The upper dies, together with the reciprocating lower die, then moving to the limit, respectively, of their downward and upward movements, the succeeding link is formed with the hook $h$ rolled upwardly and partially around the end bar of the last link of the chain. The cam $l^3$ must be sufficiently steep so that the finger L' will pull out the chain to bring the last-coupled link in proper position before the clamping or holding dies press the metal against the lower dies. It is also evident that the crank $k^4$, which operates the feeding mechanism, should be so disposed with reference to the eccentrics which operate the dies that the feeding mechanism is operated while the metal between the dies is not clamped, as the strip must be fed along while the clamping-die is somewhat distant from the stationary dies. This is necessary in order that there may be sufficient room between the clamping and stationary dies for the metal to be fed along. It will be noticed that the stop or detent M as the finger or extractor L' ascends holds the links and prevents them from being displaced or forced back into the machine. The gage or finger $h^9$, attached to the member $e$ of the clamping-die, descends close to the forward end of the link being formed and serves as an abutment or stop against which the lip $h$ is rolled up by the die $g^4$. If it were not for this gage-finger $h^9$, the hook $h$ would be rolled up so near the lip $h'$ or at such a variable distance therefrom that there would be difficulty in detaching the links and great lack of uniformity in the width of the slot or opening in the sprocket-bar, by means of which slot the links are made attachable and detachable. The gage-finger $h^9$ insures a proper distance between the hook $h$ and lip $h'$, so that the links are readily attachable. The finger $h^9$ also renders it possible for the lower die to press the end of the hook firmly against the finger $h^9$, so that when the proper distance of $h$ from $h'$ is insured a set is given to the hook whereby it is made more stiff and rigid and less liable to straighten out under heavy stress. The detent M after being forced down by the link is forced up by the spring $m$ so soon as the link has been moved along far enough to permit the entrance of the plunger between its end bars.

Figures 7, 8, 9:
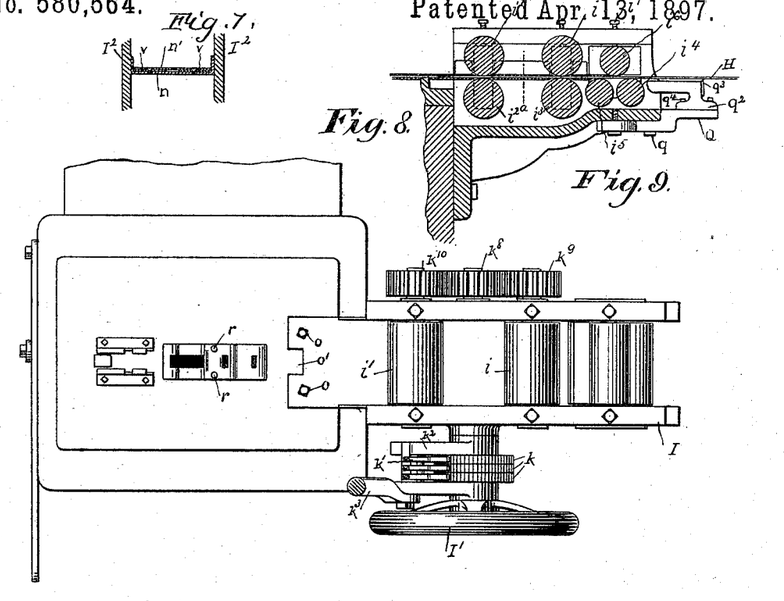
Fig. 7 is a vertical cross-section through the feed tube or spout.
Fig. 8 is a longitudinal vertical section through the feeding mechanism and spout.
Fig. 9 is a top plan view showing the feeding mechanism and the lower dies and guiding-blocks for the chain.

Referring to Fig. 7, which is a vertical section on line $a\ a$, Fig. 9, a U-shaped piece of steel $n$ is secured between the side parts $I^2\ I^2$ of the feeding-frame, and above this piece $n$ is secured another plate $n'$, between which plates are secured narrower plates $v\ v$. The plates $n\ n'\ v\ v$ form a trough or tube for the passage of the strip. It will be noticed from Figs. 9 and 10 that there are three sections of these plates, the first between the rollers $i^6$ and $i$, the second between the rollers $i$ and $i'$, and the third between the roller $i^2$ and the dies, the latter section at its forward end being secured to the bed-piece of the machine by bolts $o\ o$ and being there cut away at $o'$ to permit the metal to spring upwardly, so that it may the more readily be forced along over the stationary dies. The upper plate of the first section extends close to the roller $i^6$ and the lower plate close to the roller $i^5$. The feeding-rollers of course force the strip through the straightening-rollers and through the trough to the dies. Secured to the frame I by bolts $q$ is a frame Q, to which is fastened at $q'$ a knife-frame $q^2$, which is provided with a knife-edge $q^3$, against which the strip of metal is severed. The knife is adjustable by means of nuts $q^4$, so that the distance therefrom to the dies may be a multiple of the length of the metal required to make a link. As one roll of metal is about running out or exhausted through the operation of the machine it is cut off, if its length is not a multiple of the length of the strip required to make a link, and the end of the new roll of ribbon is introduced, so that its end will abut against the end of the preceding strip. The new end as it is caught by the feeding-rollers forces the old strip through the tube to the forming-dies. The knife and tube thus, besides saving the end of the old strip, insure the proper entrance of the new strip, so that it will not be wasted. The tube also with the new roll of metal insures the combined action of the two sets of feeding-rollers in forcing the metal over the lower dies.

Having now described our invention, what we claim as new, and desire to secure by Letters Patent, is—

1. In combination means for simultaneously performing progressive steps in the formation of several links while the links remain integral with the strip of metal and for severing a link from the strip, and means for finishing the link and simultaneously attaching it to a previously-formed link, said attaching means operating at the same time that the progressive formation of several links is taking place, substantially as set forth.

2. In a machine for making detachable-link drive-chains from sheet metal, stepping and locking mechanism to step the chain along and hold the end bar of its last link in coupling position during the stepping interval, combined with suitable mechanism to roll up and form the sprocket-bar of the succeeding link over the end bar so held, to assemble or couple the links together, substantially as set forth.

3. In a machine for making detachable-link drive-chains from sheet metal, stepping mechanism to step the chain along and locking mechanism to hold, during the stepping interval, the end bar of the last link in coupling position, combined with punching mechanism to punch out a lip from the interior of the following forming link, and forming mechanism to roll up and form the lip into the hook part of the sprocket-bar over the end bar of the link so held, to complete and assemble the link into a chain, substantially as set forth.

4. In a machine for making detachable-link drive-chains from a strip of sheet metal, crimping mechanism to crimp the stock transversely to form the upper parts of the end and sprocket bars, punching mechanism to punch out the interior of the blank into lips to form the lower or hook parts of these bars and suitable means for stepping the chain along and holding its last link with its end bar in coupling position, combined with mechanism for rolling up the lip of the sprocket-bar and forming it cylindrically over the end bar of the link so held, to complete and assemble the links, substantially as set forth.

5. In combination in a machine for making detachable-link drive-chains from a continuous strip of sheet metal, mechanism to transversely crimp the strip to form the upper parts of the end and sprocket bars, shearing mechanism to sever the link from the strip, punching mechanism to punch out lips from the interior of the strip to form hook parts of the end and sprocket bars and suitable means to roll up the lips and cylindrically form the bars, stepping and locking mechanism to step the chain along and hold the last link with its end bar in coupling position while the sprocket-bar of the succeeding link is rolled up and formed around it, to complete and assemble the link into the chain, substantially as set forth.

6. In a machine for making detachable-link drive-chains from a continuous strip of sheet metal, the combination of feeding mechanism to feed in the strip, crimping mechanism to transversely crimp the strip to form the upper parts of the end and sprocket bars, shearing mechanism to transversely and interiorly cut the strip to sever the lips for these bars, crimping mechanism to initially bend the lips to conform to the bars, and suitable mechanism to roll up and form the lips into the bars, with stepping mechanism to step the links along and locking mechanism to hold the last-assembled link with its end bar in proper coupling position while the sprocket-bar of the succeeding link is rolled up and formed around it, to make and assemble the links and by unit mechanism transform the strip of metal into a chain, substantially as set forth.

7. In a machine for making detachable drive-chains, in which the link is formed from sheet metal by a series of dies and in which the sprocket-bar of the link is formed over the opposite end bar of the preceding link, the combination with the clamping and forming dies of an extractor attached thereto and working in the lower dies to pull the chain along, so that the last link will be in position to be coupled to the succeeding link, as and for the purpose specified.

8. In a machine for making detachable drive-chains from sheet metal, the combination with reciprocating clamping and forming dies of an extracting-finger pivoted to the clamping-dies and working in the camway in the stationary lower dies to move the assembled links along so that the last link in the chain formed by the assembled links will have its end bar in proper position to be coupled to the sprocket-bar of the succeeding link by the operation of the dies, as and for the purpose specified.

9. In a machine for making detachable drive-chains from sheet metal, cutting and punching dies to cut out a lip from the interior of the link, combined with a pivoted reciprocating extractor and a reciprocating forming-die to roll up the lip into the sprocket-bar and form it over the end bar of the preceding link, substantially as and for the purpose set forth.

10. In a machine for making detachable drive-chains from sheet metal, the cutting and punching dies to cut out a lip for the sprocket-bar and a forming-die to roll up the lip into the sprocket-bar and form it over the end bar of the preceding link, combined with a pivoted reciprocating extractor to step the chain along to present the end bar of the last-assembled link in proper position to be coupled to the following link by the forming-die, and a spring-stop centrally acting on the link to hold the end bar in that position while the forming-die rolls up and forms the sprocket-bar of the succeeding link around it, as set forth.

11. The combination in a machine for making chain-links from sheet metal, with crimping, cutting and forming dies adapted to form the link with its sprocket-bar over the end bar of the link previously formed, of a pivoted reciprocating extractor to step the last-assembled link along so that its end bar will be in proper position to be coupled to the sprocket-bar of the succeeding link, and a spring-stop constantly acting on the assembled link to hold it in that proper position, substantially as set forth.

12. In a machine for making detachable drive-chains from sheet metal, the crimping, cutting and forming dies adapted to form the link with its sprocket-bar over the end bar of the link previously formed, a pivoted reciprocating extractor to step the links along, and a spring-stop springing into the central opening of the link as the extractor steps it along, combined with a guideway to hold the stepping-chain under the proper action of the spring-stop, substantially as set forth.

13. The combination in a machine for making detachable drive-chains from sheet metal of reciprocating, crimping, cutting and forming dies by which the link is formed, with its sprocket-bar over the opposite end bar of the preceding link, of a finger attached to the reciprocating die and adapted to enter between the bars of a link in the chain, of a cam to force the finger outwardly to move the chain so that the end bar of its last link will be in position to be coupled to the succeeding link, as and for the purpose specified.

14. The combination in a machine for making detachable drive-chains from a strip of sheet metal, of reciprocating cutting and forming dies adapted to form from the plate metal of the strip the sprocket-bar of each link over the end bar of the preceding link, with intermittently-operating feeding mechanism to feed the strip to the dies, as specified.

15. The combination in a machine for making detachable drive-chains from a strip of sheet metal, of reciprocating cutting and forming dies to form from the plate metal of the strip the sprocket-bar of each link over the end bar of the preceding link, with intermittently-operating feeding mechanism to feed the strip to the dies and a pivoted reciprocating extractor to step along the assembled links, as specified.

16. In a machine for making detachable drive-chains from a strip of sheet metal, reciprocating forming-dies to form from the plate metal of the strip the sprocket-bar of the link over the end bar of the preceding link, combined with feeding mechanism to intermittently feed the strip to the dies, and a reciprocating extractor to move the chain along and hold the end bar of the link last assembled in proper condition to be coupled to the sprocket-bar of the link next formed, as specified.

17. The combination in a machine for making detachable chains from a strip of sheet metal, of reciprocating forming and clamping dies to form from the metal of the strip the sprocket-bar of the link over the end bar of the link previously formed, with feeding mechanism adapted to feed the strip in while the dies are separated, and a pivoted reciprocating extractor to step the chain along operated during the initial descent of the dies to bring the end bar of the last link coupled to the chain in proper position to be coupled by the sprocket-bar of the next succeeding link, as and for the purpose specified.

18. The combination in a machine for making drive-chains from a strip of sheet metal, of forming-dies to form the sprocket of the link over the end bar of the previously-formed link and a feeding mechanism to feed the strip to the dies, with an inclosing guiding-tube between the feeding mechanism and the dies through which the strip is fed and by which the last end of the strip, forced by a second strip abutting end to end, is guided to the dies without waste, as specified.

19. In a machine for making detachable chain-links from a strip of sheet metal, the reciprocating forming-dies to form the links and assemble them in a chain and a reciprocating extractor to step the chain along, combined with a feeding mechanism to feed in the strip and a tube between the feeding mechanism and the dies and extractor through which the strip is fed and guided, as specified.

20. The combination in a machine for making detachable drive-chain links from sheet metal, of forming-dies to form the link, a feeding mechanism, a tube through which the strip is fed, and a knife to cut the last end of the strip, located at a distance from the dies which is a multiple of the length of a strip requisite to form a link, whereby the old end of the strip is forced through the tube to the dies, and the end of the new strip is properly placed between the dies, as specified.

21. In a machine for making detachable chain-links from a strip of sheet metal in which the sprocket-bar is rolled up from metal taken from the interior of the link, the forming-dies, for rolling up and forming the sprocket-bar, combined with a spacing-finger projected between the end of the lip and hook which form the sprocket-bar of the link, against which spacing-finger the end of the hook of the sprocket-bar is rolled up as specified.

22. In a machine for making detachable drive-chain links from a strip of sheet metal in which the hook part of the sprocket-bar is formed from metal taken from the interior of the link, a spacing-finger adapted to secure and maintain in the forming sprocket-bar an opening or slot of proper uniform width to make the link attachable to another link by sliding endwise its sprocket-bar over the end bar of the other link.

23. In a machine for making detachable drive-chain links from a strip of sheet metal in which the sprocket-bar of a link is formed from metal taken from the strip, a spacing-finger longitudinally so disposed in the circular recess in which the sprocket-bar is formed as to insure the exact proper width of opening or distance between the ends of its hook and lip to admit easy coupling of the links without danger of accidental uncoupling, as specified.

24. The combination in a machine for making detachable drive-chains in which the sprocket-bar of a link is formed over the end bar of the previously-formed link, the forming-dies, a vertically-reciprocating spacing finger or die to insure the proper distance of the hook from the lip of the sprocket-bar, and an extractor to move the chain along to bring the last link in proper position to be coupled to the succeeding link, as specified.

25. In a machine for making detachable drive-chains from a strip of sheet metal, the combination with the reciprocating forming-dies by which the link is crimped and formed with its sprocket-bar over the end bar of the previous link, of a spring-pressed finger adapted to pass between the side bars of one of the assembled links, a cam to force the finger outwardly, carrying with it the chain, a guideway to guide the chain, and a stop-spring actuated to allow the chain to pass over it, and to cause the stop to then enter between the side bars of a link to hold the chain in position to have the end bar of its last link coupled to the succeeding link, as specified.

In witness whereof we have hereunto set our hands this 27th day of February, 1893.

C. F. VIEILLARD.
HERMAN OSSWALD.

Attest:
FRANK SCHENCK,
PHILIP KOMPFF, Jr.